US009432352B2

(12) United States Patent
Ye et al.

(10) Patent No.: US 9,432,352 B2
(45) Date of Patent: *Aug. 30, 2016

(54) METHOD AND APPARATUS FOR PROCESSING AUTHENTICATION REQUEST MESSAGE IN A SOCIAL NETWORK

(71) Applicant: Alibaba Group Holding Limited, Grand Cayman (KY)

(72) Inventors: Jun Ye, Hangzhou (CN); Jianxiang Mo, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,827

(22) Filed: Jan. 26, 2015

(65) Prior Publication Data

US 2015/0237030 A1 Aug. 20, 2015

Related U.S. Application Data

(63) Continuation of application No. 12/867,874, filed as application No. PCT/US2010/034509 on May 12, 2010, now Pat. No. 9,009,232.

(30) Foreign Application Priority Data

Jun. 12, 2009 (CN) .......................... 2009 1 0147252

(51) Int. Cl.
*G06F 15/16* (2006.01)
*H04L 29/06* (2006.01)
(Continued)

(52) U.S. Cl.
CPC .............. *H04L 63/08* (2013.01); *G06Q 10/10* (2013.01); *G06Q 50/01* (2013.01); *H04L 63/10* (2013.01)

(58) Field of Classification Search
CPC ..... H04L 67/22; H04L 12/588; H04L 51/32; H04L 63/104
See application file for complete search history.

(56) References Cited

U.S. PATENT DOCUMENTS 7,188,153 B2 3/2007 Lunt et al.
7,424,541 B2 9/2008 Bourne
(Continued)

FOREIGN PATENT DOCUMENTS

CN 101237426 A 8/2008
JP 2006092540 4/2006
(Continued)

OTHER PUBLICATIONS

Yang-Sae Moon, "Mining Meaningful Student Student Groups Based on Communication History Records", 2007, 8 pages.*
(Continued)

*Primary Examiner* — Jerry Dennison
(74) *Attorney, Agent, or Firm* — Lee & Hayes, PLLC (57) ABSTRACT

A method and an apparatus for processing an authentication request message in a social network are provided. To improve the inefficiency of existing technology in processing user authentication and request to establish social relationship as well as inadequacy of parameters available for said authentication, the disclosed method includes a social network server detecting an authentication request message sent by a first client to a second client requesting to establish a social relationship with the second client. The social network server obtains information social attributes that are common to the first client and the second client, forwards the authentication request message, and sends the obtained information of common social attributes to the second client. The social attribute information is used by the second client to decide whether or not to authenticate the authentication request message.

18 Claims, 5 Drawing Sheets

(51) Int. Cl.
*G06Q 10/10* (2012.01)
*G06Q 50/00* (2012.01)

(56) References Cited

U.S. PATENT DOCUMENTS

| | | | |
|---|---|---|---|
| 7,433,832 | B1 | 10/2008 | Bezos et al. |
| 7,610,627 | B1 * | 10/2009 | McKenna ............... G06F 21/62 |
| | | | 713/168 |
| 7,664,669 | B1 | 2/2010 | Adams et al. |
| 7,680,770 | B1 | 3/2010 | Buyukkokten et al. |
| 7,778,890 | B1 | 8/2010 | Bezos et al. |
| 7,930,255 | B2 | 4/2011 | Choi et al. |
| 7,992,210 | B2 | 8/2011 | McKenna |
| 8,180,689 | B2 | 5/2012 | Bezos et al. |
| 8,214,301 | B2 | 7/2012 | Samuel et al. |
| 8,229,782 | B1 | 7/2012 | Adams et al. |
| 8,239,364 | B2 | 8/2012 | Wable et al. |
| 2004/0148275 | A1 * | 7/2004 | Achlioptas ........ G06F 17/30867 |
| 2005/0177614 | A1 | 8/2005 | Bourne |
| 2006/0190536 | A1 | 8/2006 | Strong et al. |
| 2007/0192299 | A1 | 8/2007 | Zuckerberg et al. |
| 2008/0115192 | A1 | 5/2008 | Kulkarni et al. |
| 2008/0215623 | A1 | 9/2008 | Ramer et al. |
| 2008/0270038 | A1 * | 10/2008 | Partovi ................. G06Q 10/00 |
| | | | 702/19 |
| 2008/0281710 | A1 | 11/2008 | Hoal |
| 2009/0077124 | A1 | 3/2009 | Spivack et al. |
| 2009/0144075 | A1 | 6/2009 | Flinn et al. |
| 2009/0271370 | A1 | 10/2009 | Jagadish et al. |
| 2009/0327417 | A1 | 12/2009 | Chakra et al. |
| 2009/0328173 | A1 | 12/2009 | Jakobson et al. |
| 2010/0004940 | A1 | 1/2010 | Choi et al. |
| 2010/0011205 | A1 | 1/2010 | McKenna |
| 2010/0057858 | A1 | 3/2010 | Shen et al. |
| 2010/0280904 | A1 | 11/2010 | Ahuja |
| 2011/0078190 | A1 | 3/2011 | Samuel et al. |
| 2011/0113101 | A1 | 5/2011 | Ye et al. |
| 2011/0161478 | A1 | 6/2011 | Formo et al. |
| 2012/0206464 | A1 | 8/2012 | Kim et al. |
| 2013/0289972 | A1 | 10/2013 | Wong et al. |

FOREIGN PATENT DOCUMENTS

| | | |
|---|---|---|
| JP | 2008192157 | 8/2008 |
| JP | 2009054054 | 3/2009 |
| JP | 2010039871 | 2/2010 |

OTHER PUBLICATIONS

The Chinese Office Action mailed Mar. 23, 2011 for Chinese patent application No. 200910147252.6.1, a counterpart foreign application of U.S. Appl. No. 12/867,874, 7 pages.

The Japanese Office Action mailed Dec. 17, 2013 for Japanese patent application No. 2012-514968, a counterpart foreign application of U.S. Appl. No. 12/867,874, 4 pages.

Non-Final Office Action for U.S. Appl. No. 12/867,874, mailed on Mar. 22, 2013, Jun Ye et al., "aMethod and Apparatus for Processing Authentication Request Message in a Social Network", 15 pages.

Office action for U.S. Appl. No. 12/867,874, mailed on Aug. 13, 2014, Ye et al., "Method and Apparatus for Processing Authentication Request Message in a Social Network", 17 pages.

Office action for U.S. Appl. No. 12/867,874, mailed on Sep. 10, 2013, Ye et al., "aMethod and Apparatus for Processing Authentication Request Message in a Social Network", 16 pages.

* cited by examiner

METHOD AND APPARATUS FOR PROCESSING AUTHENTICATION REQUEST MESSAGE IN A SOCIAL NETWORK

CROSS REFERENCE TO RELATED PATENT APPLICATIONS

This application is a continuation of and claims priority to U.S. patent application Ser. No. 12/867,874, filed on Aug. 16, 2010 entitled "Method and Apparatus for Processing Authentication Request Message in a Social Network", which is a national stage application of an international patent application PCT/US10/34509, filed May 12, 2010, which claims priority from Chinese Patent Application No. 200910147252.6, filed Jun. 12, 2009, entitled "METHOD AND APPARATUS FOR PROCESSING AUTHENTICATION REQUEST MESSAGE IN A SOCIAL NETWORK," which applications are hereby incorporated in their entirety by reference.

TECHNICAL FIELD

The present disclosure relates to Internet-based technologies and, more particularly, to a method and an apparatus for processing authentication request messages in a social network.

BACKGROUND

In the existing Internet-based environment, the social network formed by online netizens has evolved beyond the simple connection between individual subscribers, and involves one-to-many and many-to-many relationships. A social network includes online users and their related networks, such as instant message (IM) systems and Internet SNS (Social Network Service) communities based on WEB2.0. Taking an IM application for example, before its subscribers intercommunicate and exchange information through their respective IM clients, the IM application typically requires certain bilateral social network relationship between the subscribers who are about to communicate with each other, in order to accelerate orientation of communicating parties and prevent subscribers from sending spam information and/or harassing messages. In light of the rules of the current IM applications, when user A intends to initiate communication with user B who is not within his/her social relationship table, it is necessary for user A to ask for user B's consent to build a certain social relationship. To that end, user A typically sends user B an authentication request message, which expresses his/her intention to be a subscriber having certain social relationship with user B. Only when user B authenticates user A's authentication request message, will user A be allowed to access user B through user A's social relationship table and initiate communication with user B.

During the process where user A applies to be a user having certain social relationship with user B, the only way for user B to know about user A's identification and other information by which user B can decide whether or not to build the social relationship with user A is through the authentication request message manually input by user A. In other words, traditionally, the authentication request message is completely subject to user A's manual input, and it is impossible for the system to automatically acquire user A's identification and the social relationship between user A and user B. On one hand, this causes inefficiency in building social relationship between two subscribers. On the other hand, there is no way to provide sufficient parameter for user B to make decision about user A's authentication request message.

SUMMARY

In order to resolve the problems of the inefficiency in confirming request to establish social relationship by a user and inadequacy of parameter provided for authentication under existing technologies, one embodiment of the present disclosure provides a method for processing an authentication request message in a social network. The method includes the following:

providing a social network server which, upon detecting a first client sending an authentication request message to a second client requesting to establish a social relationship with the second client, obtains common social attribute information of the first client and the second client, wherein social attribute information indicates attributes of a user in the social network; and the social network server forwarding the authentication request message to the second client and sending the obtained social attribute information, wherein the social attribute information is used by the second client to authenticate the authentication request message.

Another embodiment of the present disclosure provides an apparatus for processing an authentication request message in a social network. The apparatus comprises the following:

an acquisition module that obtains an authentication request message sent by a first client to a second client requesting to establish a social relationship with the second client, and obtains common social attribute information of the first client and the second client, wherein social attribute information indicates attributes of a user in the social network; and a sending module that forwards the authentication request message and the obtained social attribute information to the second client, wherein the social attribute information is used by the second client to authenticate the authentication request message.

Through the embodiments of the present disclosure as recited above, when detecting that the first client sends an authentication request message to the second client requesting to establish a social relationship with the second client, the social network server automatically obtains the common social attribute information of the first client and the second client, and presents it to the second client. This increases the parameters according to which the second client decides whether or not to authenticate the authentication request message from the first client. This also improves the efficiency in establishing social network relationship between the first client and the second client.

DETAILED DESCRIPTION OF THE PREFERRED EMBODIMENTS

Figure 1:
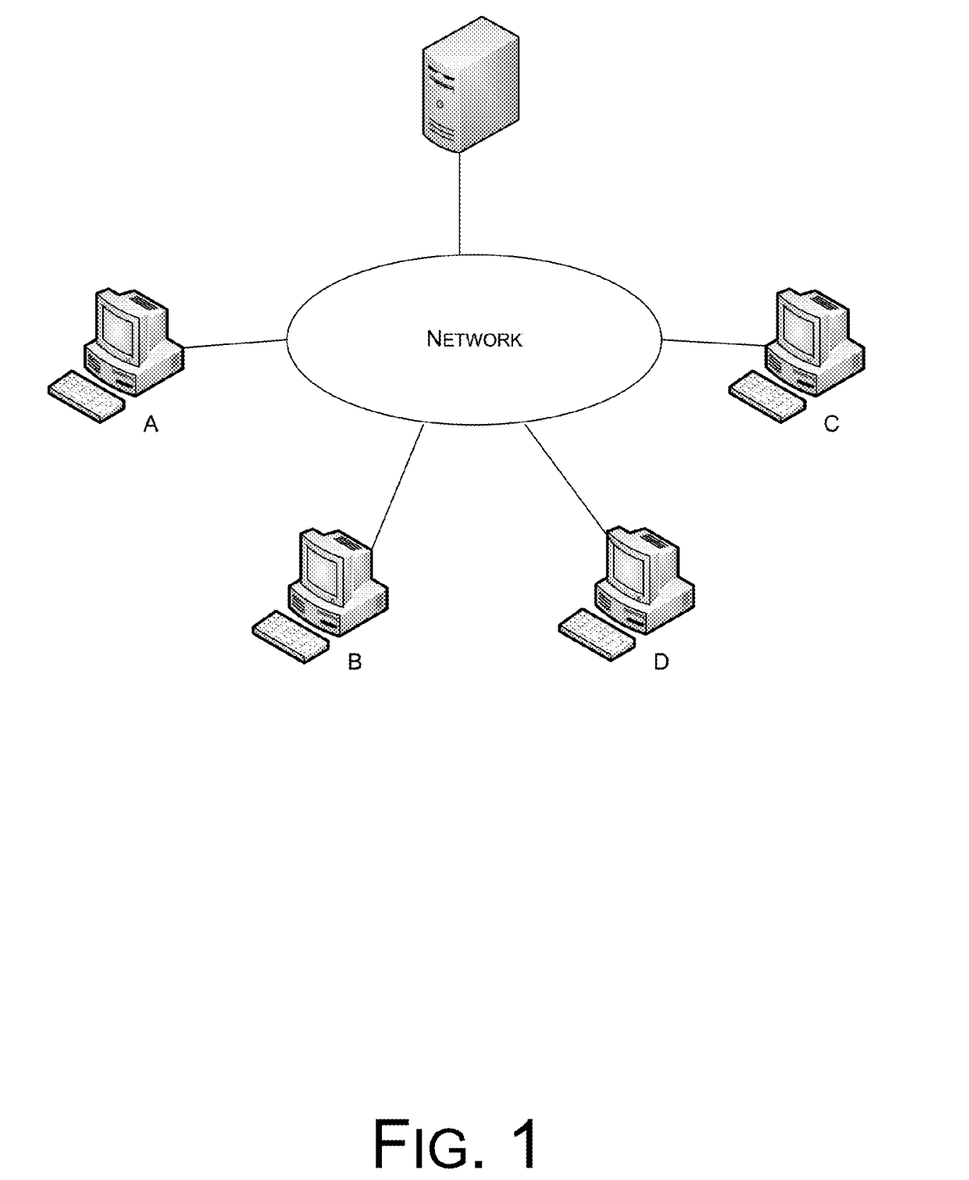
FIG. 1 is a network topology diagram in accordance with a first embodiment of the present disclosure.
Figure 2:
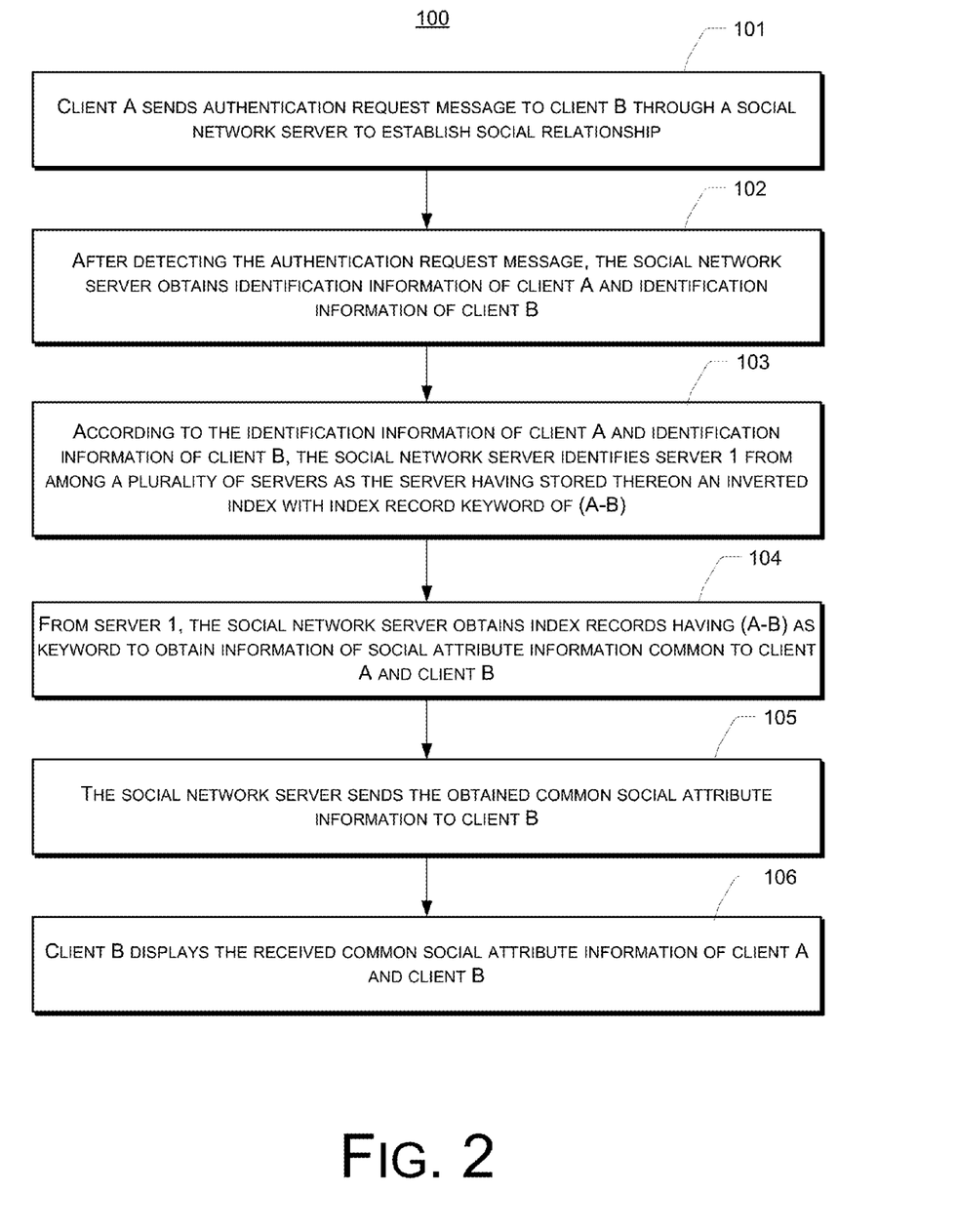
FIG. 2 is a flow chart of a method in accordance with a first embodiment of the present disclosure.

A first embodiment of the present disclosure provides a method 100 for processing an authentication request message in a social network. As implemented in the network topology of FIG. 1, the network includes a social network server and a plurality of clients. The method 100 as shown in FIG. 2 comprises actions described below.

At 101, client A sends an authentication request message to client B through a social network server to establish a social network relationship with client B.

At 102, after detecting client A sending the authentication request message to client B to establish a social network relationship, the social network server acquires identification information of client A and identification information of client B.

At 103, according to the identification information of client A and identification information of client B, the social network server determines server 1 from among a plurality of servers as the server having stored thereon an inverted index with index record keyword of (A-B), "AB" or "(AB)".

At 104, from server 1, the social network server extracts the index records having keyword (A-B), to obtain information of common social attributes of client A and client B, or to extract relationship chain information between client A and client B.

At 105, the social network server sends to client B the extracted information of common social attributes or the common relationship chain information.

At 106, client B displays the received information of common social attributes of client A and client B or the extracted common relationship chain information.

At 101, the client B stores one or more social relationship tables locally. For example, Social Relationship Table 1, shown below, includes the identity of five client identities and their corresponding social relationship categories. Each of clients C, D, E, F and G has a social relationship with client B in the category 1. Social Relationship Table 2, shown below, includes the identity of three clients and their corresponding social relationship categories, each of which is category 2. Table 1 serves to store the client identities of category 1 while Table 2 stores the client identities of category 2.

TABLE 1

| Client Identity | Social Relationship Category |
| --- | --- |
| C | 1 |
| D | 1 |
| E | 1 |
| F | 1 |
| G | 1 |

TABLE 2

| Client Identity | Social Relationship Category |
| --- | --- |
| H | 2 |
| I | 2 |
| J | 2 |

Client A, through the social network server, sends the authentication request message to the client B to be included in Table 1. The authentication request message sent by client A carries identification information of client A.

The social network server may be implemented in any server in the social network, such as server 1, server 2 or server 3 in the social network.

At 102, upon receiving the authentication request message sent by the client A, the social network server analyzes the authentication request message and extracts the identification information of client A and identification information of client B from the authentication request message. Furthermore, the social network server identifies that there are clients having direct social network relationship with client A and client B, namely client C and client D. The social network server also extracts identification information of the receiving party, client B, from the authentication request message. Table 1' having the same content as Table 1 is stored in a database of the social network server. According to the Table 1' stored in the social network server, it is confirmed that clients having direct social network relationship with client B are client C and client D. In the present step, the social network server may inquire and ascertain that the clients having direct social network relationship with client B include client C and client D. Upon receiving the authentication request message sent by client A, the social network server analyzes the authentication request message, and extracts identification information of client A of the receiving clients from the authentication request message. With the same method implemented by client B, it is confirmed that the clients having direct social network relationship with client A also include client C and client D. Preferably, client C and client D have direct social network relationship with client A while client D and client C also have direct social network relationship with client B. Of course, it may be the case that client D and client C have direct social network relationship with client B while client D and client C have indirect social network relationship with client A.

According to a predetermined rule, client C is selected from client C and client D, and identification information of client C is obtained. The predetermined rule may be based on a social network relationship chain which is the one with the highest sum of degrees of familiarity between client A and client B calculated by the social network server automatically. For example, given that the degree of familiarity of client A→client C→client B is Y1+X1 and the degree of familiarity of another social network relationship chain, client A→client D→client B, is Y2+X2, when Y1+X1>Y2+X2, client C is selected from client D and client C, and identification information of client C is obtained. Otherwise, client D is selected. In the present embodiment, client C is preferably selected. While the current step involves selecting client D or client C by degree of familiarity, the selection performed between client D and client C may be random without referring to degree of familiarity.

Alternatively, the social network server, based on the numbers of client identities in the social network relationship table of client D and the social network relationship table of client C, may select one of client D and client C. For example, when the social network relationship table of client C has 10 client identities and the social network relationship table of client D has 100 client identities, since the number of the client identities in the social network relationship table of client C is less than that of client D, it is indicated that client C may be more cautious about screening his/her social network related objects, so client C is selected. Of course, it may also be the case that when the ratio of clients between the social network relationship tables of client B and client C is 1:10, and the ratio of clients between the social network relationship tables of client B and client D is 1:100, client C is selected. Alternatively, a threshold of ratio, such as 1:20 for example, may be set. Accordingly, when the ratio of clients between the social network relationship tables of client B and client C is 1:10, greater than the threshold of 1:20, and the ratio of clients between the social network relationship tables of client B and client D is 1:100, smaller than the threshold of 1:20, client C is selected.

Moreover, the social network server may automatically select client C or client D which has the highest degree of familiarity with client B. In the event that X1>X2, the social network server selects client C; otherwise it selects client D. In the present embodiment, it is preferable to select client C.

In addition to the approach where client C is selected in light of the predetermined rule, it is possible to make the social network server send the identification information of client D and client C to client A. If client A selects client C, the social network server selects client C according to the selection of client A. On the other hand, if client A selects D, the social network server selects client D according to the selection of client A.

The overall degree of familiarity may be obtained in a fashion described below. Assuming that the time period (such as 30 days for example) during which two clients have social network relationship is N, and a type of degree of familiarity corresponding to a unit time (such as 1 day for example) is M, then the time weight of the degree of familiarity is N×M. Further, assuming that a type of degree of familiarity for the two clients to perform one information exchange in the unit time is P, the maximum of the degree of familiarity for the two clients to perform information exchanges in the unit time is Pmax, and Pmax<P*Y (wherein Y is the maximum number of times where the two clients perform information exchanges in the unit time, and if the unit time is 1 day, when 90 information exchanges, then Pmax=90 P). Through this way, the overall degree of familiarity between two clients can be computed, by summing the results of the types of degrees of familiarity, such as: X1=N1*M1+Min(Y*P, Pmax).

At 103, since there are numerous users in the social network, amounting to millions, in the present embodiment inverted indexes are previously stored in distributed servers. It is to be understood that previous storage of the inverted indexes is a preferred approach and the present embodiment is not intended to limit the timing of when the inverted indexes are built. The inverted indexes may be built after the extraction of identification information of client A and identification information of client B.

Figure 3:
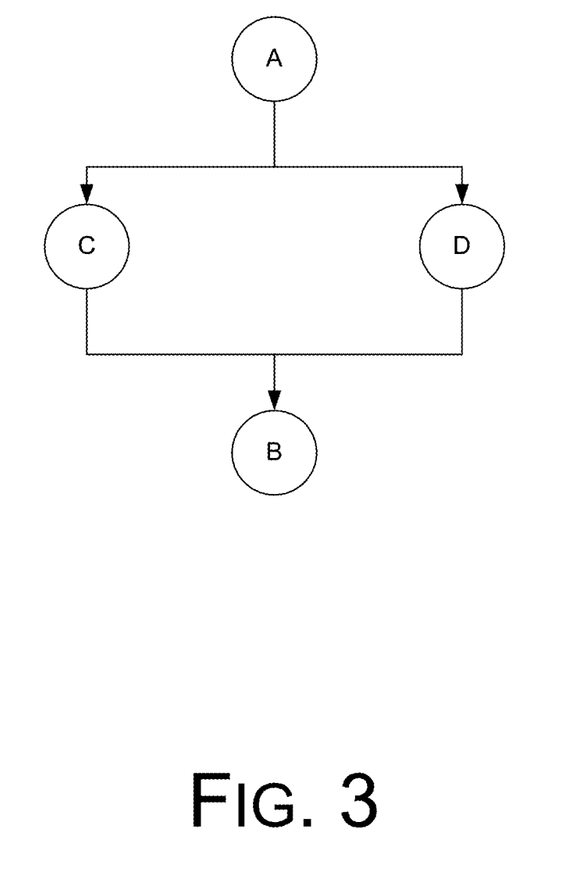
FIG. 3 is a schematic drawing showing a relationship chain in a social network of the present disclosure.

An inverted index is also known as an embedded file or an inverted file, and is an indexing method that is usually used to store a mapping of a location (the value of the word location in the index) of a certain word (acting as the keyword for indexing) in a file or a set of files under a full text search. In the present embodiment, the social network of FIG. 3 is described as an example for illustration. In the inverted index, the mutually bound identification information of client A and identification information of client B (expressed as (A-B)) are taken as the key for indexing. Given that the key is (A-B), information of the common social attributes between client A and client B is taken as the value, wherein the social attribute information represents the attributes possessed by a social network client that is corresponding to a client in the social network.

The social attribute information may be provided by the user at subscribing to the social network and includes, for example, the user's residence in the city of Hangzhou, the user's company A, and may further include information generated as results of the user's activity in the social network, such as one representing the community where the user belongs to, e.g., "World of Warcraft". The social attribute information may be acquired from the user's log or from the database where the user's subscription information is stored. The common social attribute information is extracted from individual user's social attribute information. For example, in a case where the value for indexing is {"Residence"→"Hangzhou", "Company"→"Company A", "Gender"→"male", "Industry"→"electronic hardware", "Game"→"World of Warcraft"}. The inverted index stored in server 1 is shown in Table 3 below.

TABLE 3

| Keyword | Value |
| --- | --- |
| (A-B) | {"Residence" → "Hangzhou", "Company" → "Company A", "Gender"=>"male", "Industry" → "electronic hardware", "Game" → "World of Warcraft"} |
| (A-C) | {"Residence" → "Hangzhou", "Company" → "Company A", "Gender" → "male", "Industry" → "electronic hardware", "Sports" → "soccer"} |
| (A-D) | {"Residence" → "Hangzhou", "Company" → "Company A", "Gender" → "male", "IP" → "196.168.0.*", "Game" → "World of Warcraft"} |
| (A-E) | {"Residence" → "Hangzhou", "Company" → "Company A", "Gender" → "male", "Position" → "sales", "Game" → "World of Warcraft"} |

The social network server extracts identification information of client A and identification information of client B according to the authentication request message to obtain (A-B) as the keyword, and identifies, from among server 1, server 2 and server 3, that server 1 is the server which stores the inverted index having the keyword (A-B) in the index records.

At 104, the social network server extracts index records with the keyword of (A-B) from Table 3, and extracts the corresponding value (the common social attribute information between the client A and the client B) {"Residence"→"Hangzhou", "Company"→"Company A", "Gender"→"male", "Industry"→"electronic hardware", "Game"→"World of Warcraft"}.

The social network server extracts index records having the keyword of (A-B), and extracts the relationship chain information between client A and client B. The relationship chain information between client A and client B used as the value for indexing represents that there is indirect social network relationship between two clients. For example, the clients A and D have a social relationship of category 2, and clients D and B have a social relationship of category 1. The value of the index with the keyword (A-B) is {(A-D, category 2), (D-B, category 1)}. For example, client A and client C have a social relationship of category 2, and client C and client B have a social relationship of category 1. The value of another index with the keyword (A-B) is {(A-C, category 2), (C-B, category 1)}. The inverted index stored in server 1 is shown in Table 4.

TABLE 4

| Keyword | Value |
| --- | --- |
| (A-B) | {A-D, category 2), (D-B, category 1)}; {A-C, category 2), (C-B, category 1)} |
| (A-E) | {A-B, category 2), (B-E, category 1)} |

At 105, the social network server sends the extracted {"Residence"→"Hangzhou", "Company"→"Company A", "Gender"→"male", "Industry"→"electronic hardware", "Game"→"World of Warcraft"} to the client B. By using {"Residence"→"Hangzhou", "Company"→"Company A", "Gender"→"male", "Industry"→"electronic hardware", "Game"→"World of Warcraft"}, it is verified that the user corresponding to client A and the user corresponding to client B have common attributes in the social network.

In addition, the social network server forwards the authentication request message to client B, and attaches the authentication request message with the information of the common social attributes, namely {"Residence"→"Hangzhou", "Company"→"Company A", "Gender"→"male", "Industry"→"electronic hardware", "Game"→"World of Warcraft"}. Of course, the social network server may send the authentication request message and the common social attribute information to client B separately, while the authentication request message and/or the common social attribute information respectively carry information expressing the correlation, so as to allow client B to tell that which received common social attribute information corresponds to which authentication request message, and authenticates the authentication request message according to the common social attribute information.

Alternatively, the social network server sends the extracted {(A-D, category 2), (D-B, category 1)} or {(A-C, category 2), (C-B, category 1)} to client B. Through {(A-D, category 2), (D-B, category 1)} or {(A-C, category 2), (C-B, category 1)}, the relationship chain information between client A and client B is represented. As to the relationship chain information, when forwarding the authentication request message to client B, the social network server attaches the authentication request message with the common relationship chain information. Of course, the social network server may send the authentication request message and the relationship chain information between client A and client B to client B separately while the authentication request message and/or the common social attribute information respectively carries information expressing their correlation, so as to allow client B to tell which received common social attribute information corresponds to which authentication request message, and authenticates the authentication request message according to the common social attribute information.

Further, at 103, if the social network server, according to the rule, selects client C from among the clients having direct social network relationship with client A and client B, the social network server replaces identification information of client A carried in the authentication request message sent by client A with identification information of client C in the manner that upon receiving the authentication request message sent by client A, the social network server finds identification information of client A in the authentication request message and changes it into identification information of client C. The revised authentication request message includes identification information of client C and some revised textual description. The identification information of client C identifies the client sending the revised authentication request message. An example of the revised textual description may be as follows: "client A requests to join Social Relationship Table 1". Therefore, the revised authentication request message would be read as: sending party=client C, textual description="client A requests to join Social Relationship Table 1". The authentication request message with the revised identification information is then sent to client B while including identification information of client C and some textual description originally contained in the authentication request message sent by client A. After client C is selected in light of the predetermined rule as described previously, the authentication request message with the revised identification information can be sent to client C. Upon receiving "OK" as confirmation from client C, the social network server sends the authentication request message with the revised identification information to client B; otherwise, the authentication request message with the revised identification information is not sent to client B.

At 106, client B receives the authentication request message sent by the client A requesting to establish social relationship in the form of a social relationship message box, which exhibits {"Residence"→"Hangzhou", "Company"→"Company A", "Gender"→"male", "Industry"→"electronic hardware", "Game"→"World of Warcraft"}.

Figure 4:
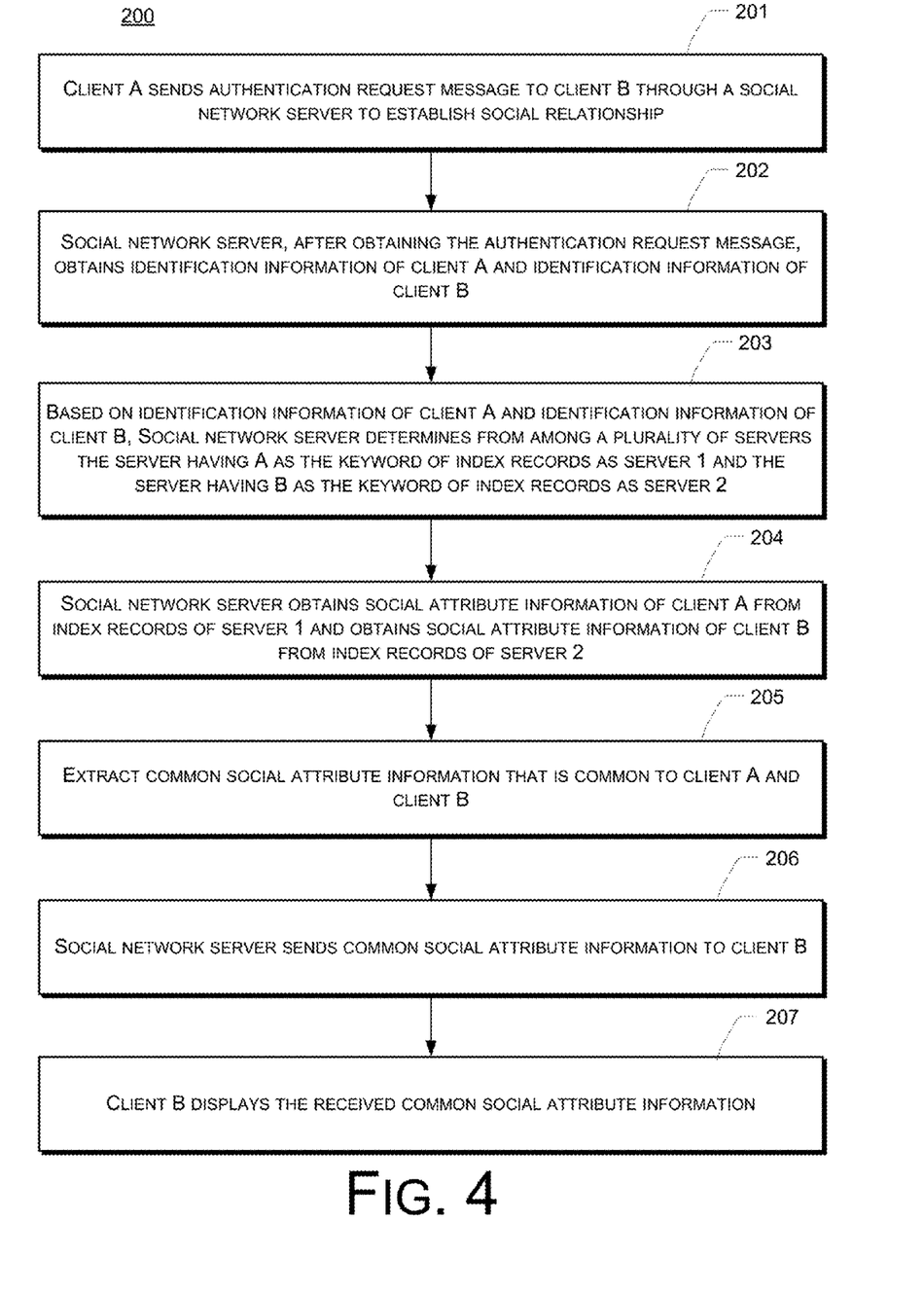
FIG. 4 is a flow chart of a method in accordance with a second embodiment of the present disclosure.

A second embodiment of the present disclosure is a method 200 for processing an authentication request message in a social network. The method 200 as shown in FIG. 4 comprises actions described below.

At 201, client A sends an authentication request message to client B through a social network server to request to establish social relationship with client B.

At 202, when detecting the authentication request message sent by client A requesting to establish social relationship with client B, the social network server obtains identification information of client A and identification information of client B.

At 203, according to identification information of client A and identification information of client B, the social network server determines from among a plurality of servers the server having A as the keyword of index records as server 1 and the server having B as the keyword of index records as server 2. Of course, if the inverted index is stored in only one server, this step can be omitted. For example, when all the index records are stored in the social network server 1, the index records with A or B as the keyword are extracted from the social network server 1.

At 204, the social network server extracts from server 1 the social attribute information of client A from the index records having keyword A, and, extracts from server 2 the social attribute information of client B.

At 205, from the social attribute information of client A and the social attribute information of client B, information of social attribute that are common to both clients A and B is extracted.

At 206, the social network server sends the extracted information of common social attributes to client B.

At 207, client B displays the received information of social attributes that are common to both client A and client B.

In the pre-stored inverted indexes of the present embodiment, the identification information is used as key of indexes, and the social attribute information of the clients of different identities as the index values. For example, identification information of client A is used as a key, and the social attribute information of the client A is used as the corresponding index value while identification information of client B is also used as a key, with the social attribute information of the client B used as the corresponding index value. Thus, the index value corresponding to the index having identification information of client A as key is as follows: {"Residence"→"Hangzhou", "Company"→"Company A", "Gender"→"male", "Industry"→"electronic hardware", "Game"→"World of Warcraft", "Sports"→"soccer", "Position"→"sales", etc.}. The index value corresponding to the index having identification information of client B as key is as follows: {"Residence"→"Hangzhou", "Company"→"Company A", "Gender"→"male", "Industry"→"electronic hardware", "Game"→"World of Warcraft", "Sports"→"table tennis", "Position"→"financial staff", etc.}. The social network server identifies the commonality between the above two values as {"Residence"→"Hangzhou", "Company"→"Company A", "Gender"→"male", "Industry"→"electronic hardware", "Game"→"World of Warcraft"}.

After 205, it is still possible for the system to automatically determine the number of the extracted pieces of common social attribute information. If the number is 10, in excess of the preset first threshold of 9, the system will automatically add user A into user B's Social Relationship Table 1. If the number is 5, in excess of the preset second threshold of 4, the system will automatically add user A into user B's Social Relationship Table 2.

Figure 5:
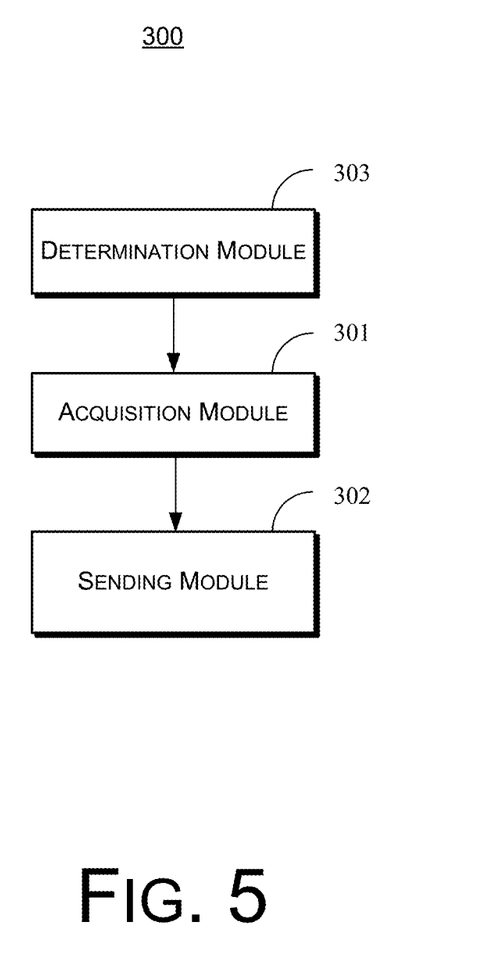
FIG. 5 is a structural diagram of an apparatus in accordance with a third embodiment of the present disclosure.

A third embodiment of the present disclosure is an apparatus 300 for processing an authentication request message in a social network, which is configured as shown in FIG. 5 and the components of which are described below.

An acquisition module 301 detects an authentication request message sent by a first client to a second client requesting to establish a social relationship with the second client. The acquisition module 301 also obtains information of social attributes that are common to the first client and the second client, where the social attribute information indicates the attribute(s) of a social network user in the social network.

A sending module 302 forwards the authentication request message and the obtained social attribute information to the second client. The social attribute information is for the second client to decide to or not to authenticate the authentication request message.

According to the identification information of the first client and a correlation between the identification information and the social attribute information of the first client, the acquisition module 301 obtains social attribute information of the first client. According to the identification information of the second client and a correlation between the identification information and the social attribute information of the second client, the acquisition module 301 obtains social attribute information of the second client. The acquisition module 301 identifies the information of social attributes common to both the first and second clients, based on the social attribute information of the first client and the social attribute information of the second client.

The acquisition module 301 searches for keywords of an inverted index to identify index records in the inverted index with a keyword identical to the identification information of the first client, and to identify index records in the inverted index and with a keyword identical to the identification information of the second client, to obtain the social attribute information of the first client and the social attribute information of the second from the identified index records. The inverted index uses the identification information of clients as the keywords of the index records and uses the clients' social attribute information as column values of the index records.

The acquisition module 301 identifies information of the social attributes that are common to the first client and the second client, according to identification information of the mutually bound first client and the second client, as well as a correlation between identification information of the two mutually bound clients and the social attribute information common to the two clients.

The acquisition module 301 further searches for a keyword of an inverted index, identifies index records in the inverted index with the keyword identical to the identification information of the mutually bound first client and second client, and obtains information of social attributes common to the first client and the second client from the identified index records. The inverted index uses the identification information of the two mutually bound clients as the keywords of the index records and uses the social attribute information common to the two clients as column values of the index records.

The apparatus includes additional components that are described below.

An identifying module 303 determines, according to identification information of the first client and identification information of the second client and from among a plurality of servers that store a correlation between clients' identification information and clients' social attribute information, the server that stores the identification information and social attribute information of the first client as well as the server that stores the identification information and social attribute information of the second client.

From the identified servers, the acquisition module 301 obtains the information of social attributes common to the first client and the second client.

The present disclosure has been described with reference to the preferred embodiments and it is understood that the disclosed embodiments are not intended to limit the scope of the present disclosure. Moreover, as the contents disclosed herein is readily understood and can be implemented by a person skilled in the art, all equivalent changes or modifications which do not depart from the concept of the present disclosure are encompassed by the appended claims.

What is claimed is:

1. A method of establishing a direct online social relationship, the method comprising:
    detecting, by a server, a request sent from a first client to a second client with whom the first client is not directly connected in an online social relationship, the request being a message requesting a direct online social relationship with the second client;
    extracting first identification information of the first client, the first identification information including a first list of tertiary clients with whom the first client is directly connected in an online social relationship;
    extracting second identification information of the second client, the second identification information including a second list of tertiary clients with whom the second client is directly connected in an online social relationship;
    analyzing the first and second lists of tertiary clients to identify particular tertiary clients that are found in both the first and the second lists;
    calculating a plurality of overall sums of degrees of familiarity, each overall sum corresponding to a respective overall sum of the degrees of familiarity between one of the respective particular tertiary clients and the first client and the second client, the calculating including:
        determining a first degree of familiarity for each particular tertiary client with respect to the first client,
        determining a second degree of familiarity for each particular tertiary client with respect to the second client, and
        summing the first degree of familiarity and the second degree of familiarity resulting in an overall sum of the degrees of familiarity with respect to each grouping of a particular tertiary client, the first client, and the second client;

selecting, based on a result of the calculating the plurality of overall sums of degrees of familiarity, a third client from among the particular tertiary clients; and forwarding, by the server, the request message and information of the third client to the second client, to enable the second client to determine whether to authorize the requested direct online social relationship with the first client.

2. The method according to claim 1, wherein the selection of the third client from among the particular tertiary clients is based on the third client having a highest sum of degrees of familiarity, among the summed degrees of familiarity of each respective particular tertiary client.

3. The method according to claim 1, wherein a quantitative expression of the first degree of familiarity is X1, X2, ... XN,
  where X represents a numerical value determined according to a predetermined rule with respect to an aspect of the social relationship between each particular tertiary client and the first client, and
  where N represents distinct particular tertiary clients with which a value X is associated,
  wherein a quantitative expression of the second degree of familiarity is Y1, Y2, ... YN,
  where Y represents a numerical value determined according to a predetermined rule with respect to an aspect of the social relationship between each particular tertiary client and the second client, and
  where N represents distinct particular tertiary clients with which a value Y is associated, and
  wherein the overall sum of the degrees of familiarity is expressed as XN+YN.

4. The method according to claim 1, wherein the selection of the third client includes identifying, as the third client, a particular tertiary client having a highest overall sum of degrees of familiarity.

5. The method according to claim 1, wherein the first identification information and the second identification information include social attribute information, and
  wherein the first and second degrees of familiarity are determined, at least in part, based on the social attribute information.

6. The method according to claim 5, wherein the social attribute information includes
  a length of time during which the first client and each respective particular tertiary client had a direct online social relationship, and
  a length of time during which the second client and each respective particular tertiary client had a direct online social relationship.

7. The method according to claim 5, wherein the social attribute information includes a number of times that an information exchange occurred between the first client and each respective particular tertiary client during a fixed time period.

8. The method according to claim 5, wherein the social attribute information includes a number of times that an information exchange occurred between the second client and each respective particular tertiary client during a fixed time period.

9. The method according to claim 1, further comprising determining social attributes that are common between the first client and the second client.

10. The method according to claim 1, further comprising determining social attributes that are common between the first client and the third client.

11. The method as claimed in claim 10, further comprising determining social attributes that are common between the first client and each particular tertiary client,
  wherein each common social attribute is considered to be a degree of familiarity.

12. The method as claimed in claim 11, wherein the selection of the third client from among the particular tertiary clients is based on the third client having a highest sum of degrees of familiarity, among the summed degrees of familiarity of each respective particular tertiary client.

13. The method according to claim 1, further comprising:
  determining social attributes that are common between the first client and the second client; and
  determining social attributes that are common between the first client and the third client,
  wherein the social attributes include
  activities engaged in by the first client and the second client, and
  activities engaged in by the first client and the third client.

14. The method as claimed in claim 1, further comprising:
  selecting multidimensional social attribute information of the first client and the second client; and
  sending the selected multidimensional social attribute information to the second client.

15. An apparatus for processing a request for a direct online social relationship, the apparatus comprising:
  one or more processors; and
  memory to maintain a plurality of components executable by the one or more processors, the plurality of components including:
    an acquisition module, that:
      detects a request sent from a first client to a second client with whom the first client is not directly connected in an online social relationship, the request being a message requesting a direct online social relationship with the second client,
      extracts first identification information of the first client, the first identification information including a first list of tertiary clients with whom the first client is directly connected in an online social relationship,
      extracts second identification information of the second client, the second identification information including a second list of tertiary clients with whom the second client is directly connected in an online social relationship,
      analyzes the first and second lists of tertiary clients to identify particular tertiary clients that are found in both the first and the second lists,
      calculates a plurality of overall sums of degrees of familiarity, each overall sum corresponding to a respective overall sum of the degrees of familiarity between one of the respective particular tertiary clients and the first client and the second client, where calculating includes:
        a determination of a first degree of familiarity for each particular tertiary client with respect to the first client,
        a determination of a second degree of familiarity for each particular tertiary client with respect to the second client, and
        a summation of the first degree of familiarity and the second degree of familiarity resulting in an overall sum of the degrees of familiarity with respect to each grouping of a particular tertiary client, the first client, and the second client, and selects, based on a result of the calculating the plurality of overall sums of degrees of familiarity, a third client from among the particular tertiary clients, and a transmitting module that forwards the request message and information of the third client to the second client, to enable the second client to determine whether to authorize the requested direct online social relationship with the first client.

16. The apparatus according to claim 15, wherein the selection of the third client from among the particular tertiary clients is based on the third client having a highest sum of degrees of familiarity, among the summed degrees of familiarity of each respective particular tertiary client.

17. The apparatus according to claim 15, wherein a quantitative expression of the first degree of familiarity is X1, X2, . . . XN, where X represents a numerical value determined according to a predetermined rule with respect to an aspect of the social relationship between each particular tertiary client and the first client, and where N represents distinct particular tertiary clients with which a value X is associated, wherein a quantitative expression of the second degree of familiarity is Y1, Y2, . . . YN, where Y represents a numerical value determined according to a predetermined rule with respect to an aspect of the social relationship between each particular tertiary client and the second client, and where N represents distinct particular tertiary clients with which a value Y is associated, and wherein the overall sum of the degrees of familiarity is expressed as XN+YN.

18. The method according to claim 17, wherein the selection of the third client includes identifying, as the third client, a particular tertiary client having a highest overall sum of degrees of familiarity.

* * * * *